July 11, 1944.  W. C. TROENDLE  2,353,325
BRAKE FOR BABY CARRIAGES, ETC
Filed June 8, 1942
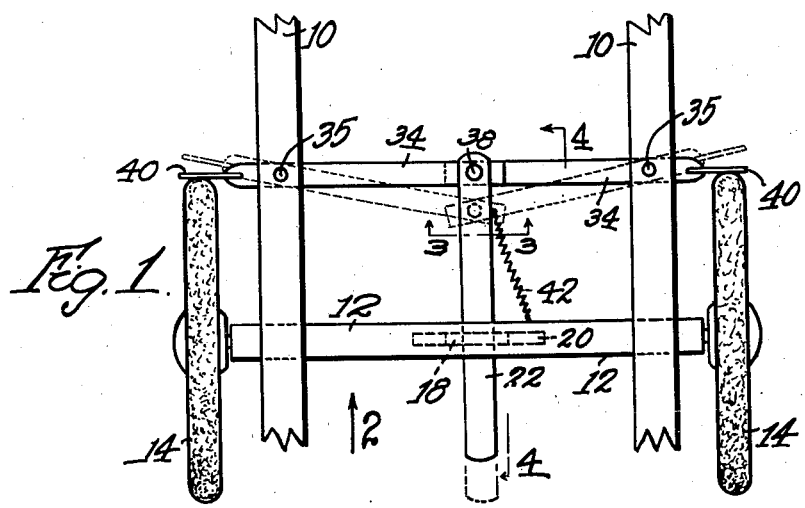
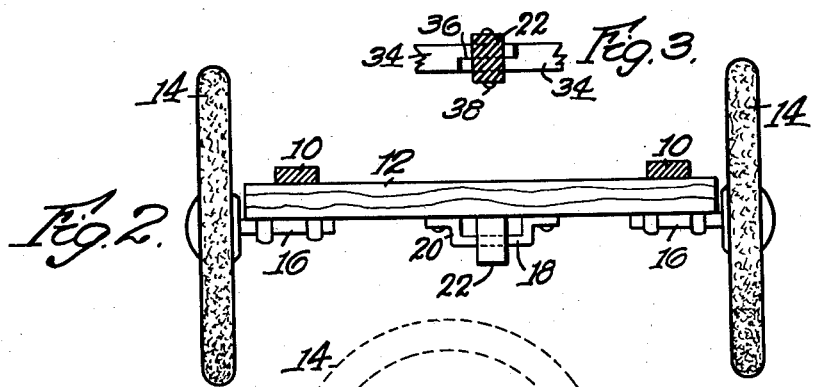
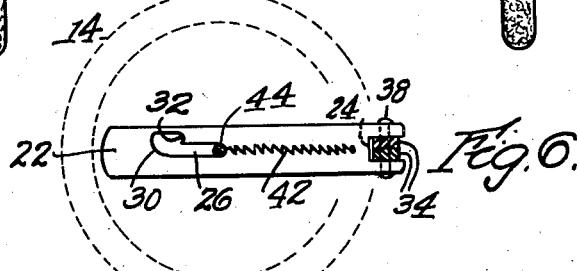
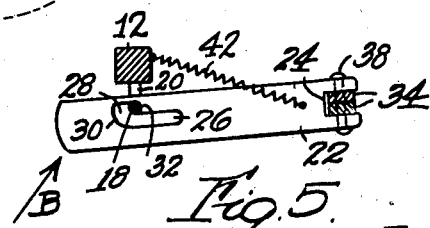
Inventor
William C. Troendle
By attorney
Charles R. Ray Patented July 11, 1944

2,353,325

UNITED STATES PATENT OFFICE 2,353,325

BRAKE FOR BABY CARRIAGES, ETC.

William C. Troendle, Gardner, Mass., assignor to Thayer Company, Gardner, Mass., a corporation of Massachusetts Application June 8, 1942, Serial No. 446,269

13 Claims. (Cl. 188—20)

This invention relates to new and improved foot brakes for light vehicles including baby carriages and the like.

Objects of the invention include the provision of a strong and easily operated foot brake of the nature described and which may be made largely of wood and wherein a longitudinally movable foot operated brake bar or operating element is mounted on a relatively fixed part of the vehicle as for instance at the rear of the carriage convenient to the operator's foot, said operating element being effective to apply either one or a pair of brakes to either or both rear wheels depending on whether the carriage is equipped with a single or double brake, a simple downward and forwardly pushing motion on the rear end of the operating element being sufficient to apply the brake and to latch the operating element in braking position. In order to release the brake, the toe is merely brought up under the same end of the now latched operating element to unlatch the same, and a spring then automatically withdraws the brake and thus frees the wheels.

Further objects of the invention include the provision of a novel foot brake for vehicles comprising an apertured or slotted operating bar, a fixed part of the vehicle passing through the aperture or slot, the latter being arranged to permit sliding movement of the bar with respect to said fixed part, there being a notch or the like latching means in the aperture or slot for holding the bar fixed in braking condition with relation to the fixed vehicle part, and including a spring for normally maintaining the operating bar in non-braking condition, said bar applying or releasing brakes with relation to the vehicle wheels by reason of its sliding motion under the control of the operator.

Other objects and advantages of the invention will appear hereinafter.

Reference is to be had to the accompanying drawing, in which

Fig. 1 is a top plan view of the rear wheels of a carriage and shows the relation of the novel braking arrangement thereto;

Fig. 2 is a rear elevation of the parts of Fig. 1 looking in the direction of arrow 2;

Fig. 3 is a section on line 3—3 of Fig. 1.

Fig. 4 is a section on line 4—4 of Fig. 1 and showing the brake operating bar in normal unbraking position;

Fig. 5 is a view similar to Fig. 4 but showing the brake operating bar in braking position; and Fig. 6 is a view similar to Fig. 4 but showing a modification of the invention.

In the drawing, the reference numeral 10 indicates the two lower, longitudinal frame bars of a baby carriage which are normally mounted on or suspended from the wheel shafts, but it is to be understood that these frame members may take many forms and in fact could comprise the bottom of a wagon or other structural part or parts of a light vehicle. A cross bar 12 is provided in the present instance to connect the frame bars 10, as in this case the carriage shafts have been dispensed with, it being intended, but is not necessary to the operation of the novel brake, to make the parts 10 and 12 of wood. Whether frame bars 10 are mounted on top of or are suspended from the cross bar or bars 12 is immaterial, there being of course a front cross bar, not shown, similar to the bar 12.

The wheels 14 of the present carriage are journaled on short rods 16 secured to the frame bars or cross bars in any way convenient or desired, and by this means the usual long wheel shaft is able to be done away with.

As shown in Figs. 1–4 inclusive, a short rod 18 depends centrally of the cross bar 12, this rod having arms 20 spacing it from the lower side of the cross bar, in the manner of a drawer pull, and the arms and rod comprise a bracket having a closed aperture therethrough for a purpose to be described. This bracket could be mounted where desired or convenient but for illustrative purposes it is suspended as shown, but in any case it is desirable to provide a short rod, such as that shown at 18, secured to the cross bar longitudinally thereof and spaced therefrom.

A brake operating element or bar 22 is provided with a forward open ended notch 24 and a generally rearwardly placed slot, the latter being narrow at its forward portion as at 26 and extending rearwardly to form an enlarged opening 28 having a rearwardly and upwardly inclined edge 30 at its rearwardmost extent. Opposite the inclined edge 30 and above the narrow forward portion 26 there is a stop shoulder or notch 32 as clearly shown in Figs. 4 and 5.

At points slightly forwardly of the peripheries of the wheels 14, a pair of brake rods 34 are pivoted to the undersides of frame bars 10 to be suspended therefrom as by bolts 35. These brake rods are pivoted together at their inner ends and are notched as shown at 36 in Fig. 3 to interfit, and at this point, the notched ends of the brake rods are received in the notch 24 at the forward end of the brake operating element 22, a rivet or bolt 38 extending through all three elements to pivotally secure them together. The brake rods may be provided with brake shoes 40 at their free ends for braking engagement with the tires of wheels 14.

As shown, the brake operating bar 22 is assembled on the rod 18 so that the latter supports it for relative sliding movement rearwardly and forwardly of the carriage as determined by the length of the slot. The brake rods 34 are somewhat loosely mounted on their bolts, but even so they support the forward end of the bar 22. A tension spring 42 is secured at its ends to the cross bar 12 and to a forward portion of the bar 22, to normally maintain the latter in its rearward position, see the dotted lines in Fig. 1 and the showing of Fig. 4. In this condition of the operating bar 22, the brake rods 34 are swung to move the brake shoe ends thereof forwardly away from the wheels, and therefore spring 42 yieldably maintains the wheels in unbraked condition. However, if the operator's foot be applied to the rear end of the bar 22 and a downward and forward motion is applied thereby, in the direction of arrow A in Fig. 4, the spring will yield and the bar will move forwardly and down at its rear end, the rod 18 relatively rising up the incline 30. By letting the spring now take effect, bar 22 is slightly drawn back and the notch 32 holds the rod 18 and latches the brake rods in braking condition, as the bar is then held in its forward, or braking position, see Fig. 5, and the solid line showing in Fig. 1.

To release the brake, it is merely necessary to insert the toe under the rear end of the bar 22 and lift up, in the general direction of arrow B in Fig. 5, this action freeing the bar from the rod 18 and allowing the spring to return the bar to its rearward position and the brake rods are naturally thereby swung to unbraking position, see Fig. 4 and the dotted lines in Fig. 1.

In the modification of Fig. 6, a wheel shaft 44 connects the wheels, and in this case the operating bar 22 is mounted directly on this shaft. Otherwise the construction and operation is the same as above described, but of course the cross bar 12 is not used as the shaft 44 takes its place, similarly to an extension and connection of rods 16. In Fig. 6, the frame bars 10 will be connected directly to the shaft 44.

Having thus described my invention and the advantages thereof, I do not wish to be limited to the details herein disclosed, otherwise than as set forth in the claims, but what I claim is:

1. In a vehicle brake of the class described, the combination with a frame member, a wheel, and a second frame member substantially parallel to the axis of the wheel; of an element mounted on said second frame member for sliding movement transversely thereto, a brake rod pivoted to said first named frame element, a pivot connection between said brake rod and said slidable element, means normally and yieldingly urging said element toward one limit of its sliding movement, means adapted to latch said element adjacent the opposite limit of its sliding movement, said brake rod being effective to engage and brake said wheel under influence of said element when the latter is latched, said element-latching means comprising a slot in said element, a relatively fixed rod or the like passing through said slot, and a notch in said slot for receiving the rod to latch the element.

2. The combination of claim 1 wherein said rod is fixed to said second frame element.

3. The combination of claim 1 wherein said rod is fixed in spaced relation to said second frame element.

4. In a vehicle brake of the class described, the combination with the wheels and frame of a vehicle wherein two frame members are located at substantially right angles; of a brake operating element mounted on a frame member for sliding movement thereon, a spring tending to urge said element towards unbraking position, a brake rod pivoted on another frame member and having a swinging movement between braking and unbraking positions, a pivot operatively connecting said brake operating element and said brake rod whereby the latter may move the former between its positions, a longitudinal slot in said element, a rod or the like fixed with relation to the vehicle and entering said slot, and means adjacent one end of the slot for retaining the rod relative to the element in braking position thereof.

5. The combination of claim 4 wherein said rod retaining means comprises a notch opening towards one end of the slot.

6. The combination of claim 4 wherein said rod retaining means comprises an enlargement in said slot, said enlargement forming a shoulder.

7. The combination of claim 4 wherein said slot is provided with means forming an offset notch, and a cam surface for relatively guiding the rod into the notch.

8. In a light vehicle brake, the combination of a vehicle frame and its wheels with a relatively fixed member extending between the wheels, an elongated bar having a slot therethrough, said member having a portion thereof extending through the slot, said bar being slidable on said portion, means forming an enlargement in said slot at an end thereof, said enlargement providing a shoulder in said slot, a spring urging said bar in a direction to maintain it with said portion in the narrow part of the slot, a brake rod connected to said bar for operation thereby to brake the vehicle when said portion of the fixed member is located at and stopped by the slot shoulder.

9. The combination of claim 8 wherein said fixed member provides a support for the wheels.

10. The combination of claim 8 wherein said fixed member comprises a wheel shaft.

11. The combination of claim 8 wherein said fixed member portion comprises a rod located in fixed spaced relation thereto.

12. A brake comprising a brake-operating element, a slot through said element, said slot having a narrow portion and an enlarged portion forming a shoulder in the slot, a support for said element on which it is slidable, and comprising a rod-like member extending through the slot, spring means normally maintaining the element with the rod-like member in the narrow portion of the slot, a brake rod, and means moving said brake rod to braking position upon movement of said element relative to said rod-like member to the location of the shoulder.

13. A vehicle brake comprising a brake-operating element, a fixed support on the vehicle on which the element is slidable, an aperture in said element, said aperture having a narrow end and an enlarged end forming a shoulder, said support extending through the aperture, means yieldingly urging said brake-operating element in a direction to maintain the support in the narrow end of the slot, a brake rod, and a connection between said brake-operating element and brake rod whereby the former is effective to move the latter to braking position when it is moved against the tension of said urging means.

WILLIAM C. TROENDLE.